United States Patent

Shoji et al.

[11] Patent Number: 6,134,448
[45] Date of Patent: Oct. 17, 2000

[54] SYSTEM FOR DETECTING POSITIONAL INFORMATION

[75] Inventors: Yoshiteru Shoji, Amagasaki; Hiroaki Koshima, Toyonaka; Yoshitaka Ohta, Suita, all of Japan

[73] Assignees: Matushita Electric Industrial Co., Ltd; Locus Corp., both of Osaka, Japan

[21] Appl. No.: 09/125,966
[22] PCT Filed: Mar. 3, 1997
[86] PCT No.: PCT/JP97/00636
§ 371 Date: Dec. 30, 1998
§ 102(e) Date: Dec. 30, 1998
[87] PCT Pub. No.: WO97/33386
PCT Pub. Date: Sep. 12, 1997

[30] Foreign Application Priority Data

Mar. 5, 1996 [JP] Japan ................. P8-047190

[51] Int. Cl.[7] ................. H04Q 7/20; G01S 3/02
[52] U.S. Cl. ................. 455/456; 342/450
[58] Field of Search ................. 455/457, 456, 455/226.2; 701/300; 342/463, 450

[56] References Cited

U.S. PATENT DOCUMENTS

| | | | |
|---|---|---|---|
| 5,657,487 | 8/1997 | Doner | 455/456 |
| 5,732,354 | 3/1998 | MacDonald | 455/456 |
| 5,883,598 | 3/1999 | Parl et al. | 455/456 |
| 5,926,765 | 7/1999 | Sasaki | 455/457 |
| 6,006,089 | 12/1999 | Sasaki et al. | 455/456 |
| 6,006,097 | 12/1999 | Hornfeldt et al. | 455/456 |

FOREIGN PATENT DOCUMENTS

| | | |
|---|---|---|
| 2-44929 | 2/1990 | Japan. |
| 5-252099 | 9/1993 | Japan. |
| 7-38951 | 2/1995 | Japan. |

*Primary Examiner*—Nguyen Vo
*Assistant Examiner*—Eliseo Ramos-Feliciano
*Attorney, Agent, or Firm*—Wenderoth, Lind & Ponack, L.L.P.

[57] ABSTRACT

A mobile terminal has a simple construction in a mobile communication system of a small-zone system. The mobile terminal 1 transmits base station identification information transmitted from base stations 2a through 2d and information of the intensity of electric field of received radio wave from the base station to a position managing station, while the position managing station specifies the current position of the mobile terminal, based on the above-mentioned information by means of a relational expression of the intensity of electric field and a distance between a point of transmission and reception and a database of the base station. With the simple construction of the mobile terminal 1, the current position of the mobile terminal 1 can be specified with higher accuracy. Further, the mobile terminal 1 transmits the base station identification information of the plurality of base stations and the intensity of electric field of the received radio wave from the base station to the position managing station, the current position of the mobile terminal 1 can be specified with higher accuracy.

4 Claims, 3 Drawing Sheets

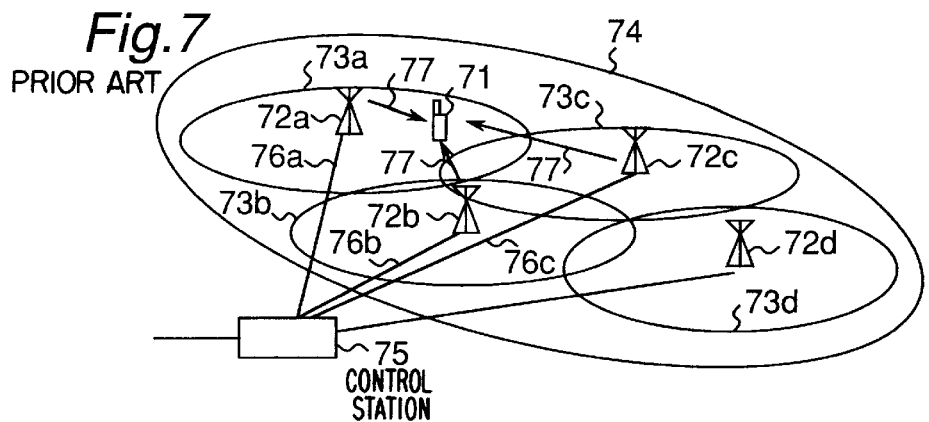
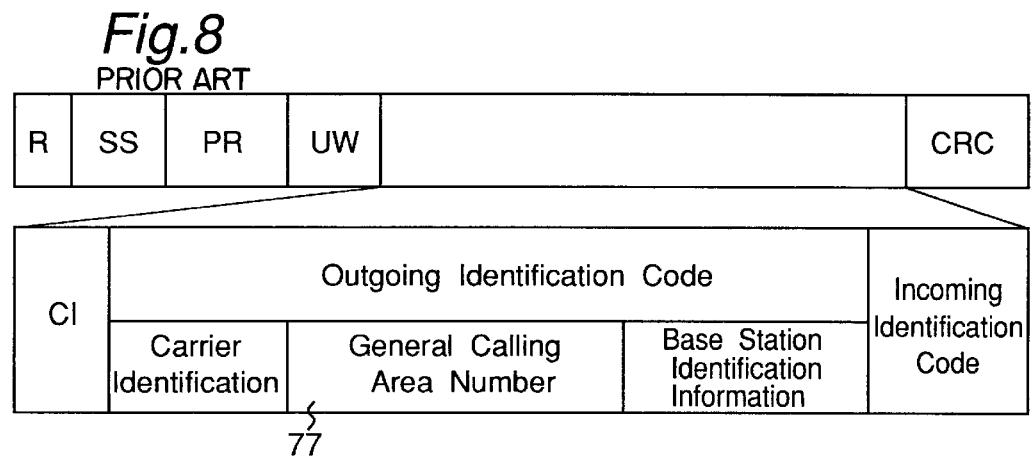
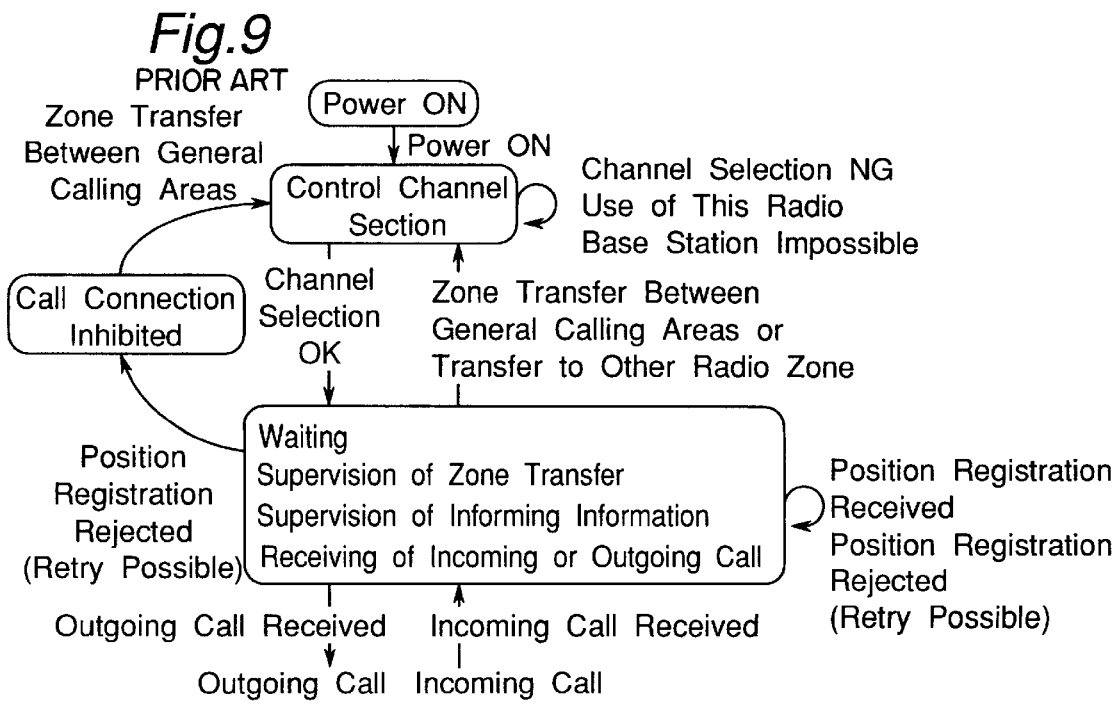

6,134,448

SYSTEM FOR DETECTING POSITIONAL INFORMATION

TECHNICAL FIELD

The present invention relates to a positional information detecting system for executing positional detection of a wireless mobile terminal in a mobilecommunication.

BACKGROUND ART

In recent years, mobile communication systems such as land mobile radio telephone, portable telephone and personal handy phone system (referred to as a PHS hereinafter) have been put into practical use and are rapidly gaining popularity. For the compacting and power saving of the wireless mobile terminal (referred to as a mobile terminal hereinafter), the effective use of radio waves and the other purposes, the radio zones of these mobile communication systems are distributed into ranges of micro-cells and pico-cells, which are smaller than in the conventional case.

In the mobile communication system, a line setting for communications is executed on a mobile terminal from a communication line network, thereby achieving a call. For this purpose, the registration and management of calling areas of the mobile terminal are executed. In the above-mentioned systems using micro-cells and pico-cells, it is proposed to utilize a calling area registering operation of a mobile terminal for specifying the position of the mobile terminal, taking advantage of such feature that each radio zone is small.

An example of the specifying of the position of a mobile terminal in the case of the PHS will be described below.

FIG. 7 shows a construction of a PHS public service system. FIG. 8 shows a construction of a physical slot for controlling a control channel. FIG. 9 shows an operation flow at the time of registering a calling area of a mobile terminal.

In FIG. 7, 71 denotes a mobile terminal;

72a, 72b, 72c, . . . denote base stations for executing speech call communications and registration of calling areas together with the mobile terminal 71, 73a, 73b, 73c, . . . denote radio zones of the base stations 72a, 72b, . . . , respectively;

74 denotes a general calling area comprised of a plurality of above-mentioned radio zones 73a, 73b, . . . ; and 75 denotes a control station for executing control of line connection to the mobile terminal 71 located inside the general calling area 74.

The base stations 72a, 72b, 72c, . . . are connected to one another through the control station 75 and the telecommunication line equipments 76a, 76b, 76c, . . . .

The base stations 72a, 72b, 72c, . . . periodically transmit a signal including a general calling area number 77 of the control station 75, using a control slot shown in FIG. 8, so as to execute call connection with the mobile terminal 71.

FIG. 8 shows a construction of a physical slot for controlling the control channel of the PHS public system, where the general calling area number 77 is included in an outgoing identification code section shown in the figure.

The base stations 72a, 72b, 72c, . . . managed by the control station 75 transmit an identical general calling area number 77 and transmit base station identification information that differ depending on each base station.

The control stations of adjacent general calling areas transmit different general calling area numbers. The mobile terminal 71 detects the change of the general calling area number and registers the calling area in the control station via the base station.

In the operation flow of FIG. 9, the mobile terminal 71 establishes a synchronism with a signal from a base station which received a signal at the maximum intensity of electric field in a "control channel selection" state after turning on the power, and transfers to a "waiting" state with the recognition of "channel selection OK" when the base station can be used. When no synchronism can be established with the base station or when the base station cannot be used, the control channel selection is executed again.

In the "waiting" state, the general calling area number transmitted from the currently receiving base station is compared with the general calling area number when the mobile terminal has executed the registration of the calling area at the preceding time, and when the numbers are different from each other, the calling area is registered in the control station that controls the base station.

Further, in the "waiting" state, a difference between the retention level of the intensity of electric field of waiting and the level of the intensity of received electric field is watched, thereby making a decision on radio zone transfer and zone transfer between general calling areas (change of registration of calling area).

If the level of the intensity of received electric field is lower than the retention level of the intensity of electric field for waiting, then a transfer to the "control channel selection" state is effected, and a synchronism is established with the signal from the new base station which received a signal at the maximum intensity of electric field, thereby effecting a transfer to the "waiting state". In the "waiting state", the general calling area number transmitted from the currently receiving base station is compared with the general calling area number when the mobile terminal has executed the registration of the calling area at the preceding time, and when the numbers are different from each other, the calling area is newly registered in the control station that controls the base station similar to the above-mentioned case.

As described above, the mobile terminal executes the calling area registration, and the control station detects that the mobile terminal is located inside the calling area of the station itself.

Since the positional information (geographical information) of the calling area that each control station manages has been already known, the current position of the mobile terminal registered in the control station is subordinately specified.

However, with the above-mentioned construction, the mobile terminal does not execute position registration until the general calling area number changes, and therefore, the locating or positional specifying of the mobile terminal can only be executed in the unit of each general calling area comprised of a plurality of radio zones. Therefore, the above-mentioned construction has been insufficient for such an application that requires locating or positional specifying of the current position of the mobile terminal with a high accuracy.

DISCLOSURE OF THE INVENTION

An object of the present invention is to solve the above-mentioned problems, and provides a positional information detecting system capable of specifying the position of a mobile terminal with a higher accuracy in a mobile communication system of a small-zone system.

In order to achieve this object, a positional information detecting system of the present invention comprises:

(1) a mobile terminal;

a plurality of base stations for executing communications with the mobile terminal; and a position managing station for transmitting a signal to and receiving a signal from the mobile terminal via the base stations, wherein the mobile terminal comprises:

an ID detection section for detecting base station identification information transmitted from each of the base stations;

an intensity of electric field measuring section for measuring an intensity of electric field of received radio wave from each of the base stations; and a transmission signal generation section for converting one or a plurality of pairs of information comprised of the base station identification information of one or a plurality of base stations and the intensity of electric field of received radio wave from the base station, into a transmission signal to the base station, wherein the position managing station comprises:

a signal demodulation section for demodulating a signal received from the mobile terminal via the base station;

a database in which information of a plurality of base stations are stored; and a position calculation section for determining the position of the mobile terminal, with reference to the database, based on one or a plurality of pairs of information comprised of the base station identification information of one or a plurality of base stations outputted from the signal demodulation section and the intensity of electric field of the received radio wave from the base station.

(2) In addition to the above item (1), the position managing station is provided with a mobile terminal calling section for originating a call to the mobile terminal.

(3) In the above items (1) or (2), the transmission signal generation section converts the pair of information into a DTMF signal, and the signal demodulation section is provided with a construction for demodulating the received DTMF signal into the pair of information.

BRIEF DESCRIPTION OF THE DRAWINGS

FIG. 7 is a schematic view of a PHS public service system;

FIG. 8 is a schematic view of a physical slot of a communication control channel of the PHS public service; and FIG. 9 is a chart showing an operation at the time of registering the calling area of a mobile terminal in the case of a PHS public service.

BEST MODE FOR CARRYING OUT THE INVENTION

Figure 1:
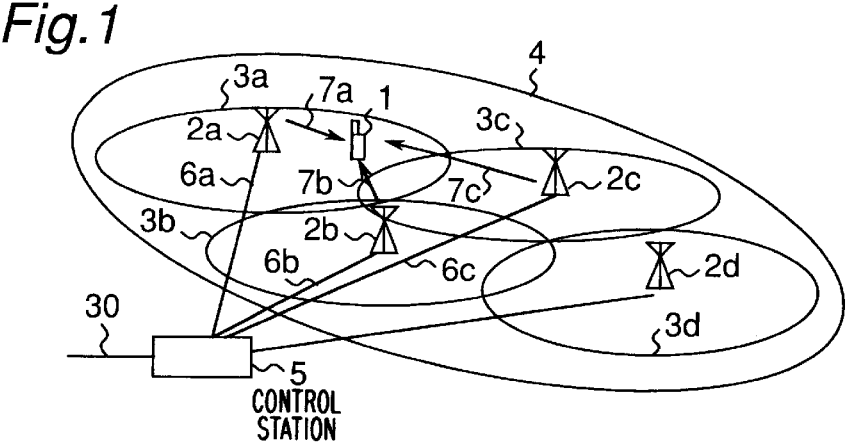
FIG. 1 is an arrangement view of base stations and a mobile terminal according to a first preferred embodiment of the present invention.

The present invention comprises:

a wireless mobile terminal;

a plurality of base stations for executing communications with the wireless mobile terminal; and a position managing station for transmitting a signal to and receiving a signal from the wireless mobile terminal via the base stations, wherein the wireless mobile terminal comprises:

an ID detection section for detecting base station identification information transmitted from each of the base stations;

an intensity of electric field measuring section for measuring an intensity of electric field of received radio wave from each of the base stations; and a transmission signal generation section for converting one or a plurality of pairs of information comprised of the base station identification information of one or a plurality of base stations and the intensity of electric field of the received radio wave from the base station, into a transmission signal to the base station, wherein the position managing station comprises:

a signal demodulation section for demodulating a signal received from the wireless mobile terminal via the base station;

a database in which information of a plurality of base stations are stored; and a position calculation section for determining a position of the wireless mobile terminal, with reference to the database, based on one or a plurality of pairs of information comprised of the base station identification information of one or a plurality of base stations outputted from the signal demodulation section and the intensity of electric field of received radio wave from the base station.

With this construction, the mobile terminal detects the base station identification information of each base station and the information of the intensity of received electric field, and transmits the same to the position managing station, and then, the position managing station calculates the position of the mobile terminal, with reference to the database, based on a correlation between the intensity of radio wave from the base station and the distance from the base station to the mobile terminal. Therefore, the position of the mobile terminal can be specified with higher accuracy. Furthermore, the position managing station can specify the position of the mobile terminal with higher accuracy, by using the information of the intensities of radio waves from the plurality of base stations transmitted from the mobile terminal.

According to the present invention, in addition to the above-mentioned invention, the position managing station further comprises a mobile terminal calling section for originating a call to the wireless mobile terminal. With this arrangement, the mobile terminal detects the base station identification information and the information of the intensity of electric field of the received radio wave from the base station, and then, transmits the same to the position managing station at the timing when receiving the calling from the position managing station, and therefore, the unnecessary power consumption of the mobile terminal is prevented to allow the mobile terminal to have a long battery life and compact size. In addition, the mobile terminal can provide the updated positional information upon request for searching the current position from the position managing station.

According to the present invention, based on the above-mentioned invention, the transmission signal generation section converts the pair of information into a DTMF (dualtone multiple-frequency) signal, and the signal demodulation section has a construction for demodulating the received DTMF signal into the pair of information. With this arrangement, the DTMF signal generating section provided in the normal speech communication mobile terminal can be commonly used for the generation of a transmission signal, so that a mobile terminal having both functions of speech communication and position search can be implemented on about the same circuit scale as that of the normal speech communication mobile terminal.

Preferred embodiments of the present invention will be described below with reference to the drawings.

(First Preferred Embodiment)

Figure 2:
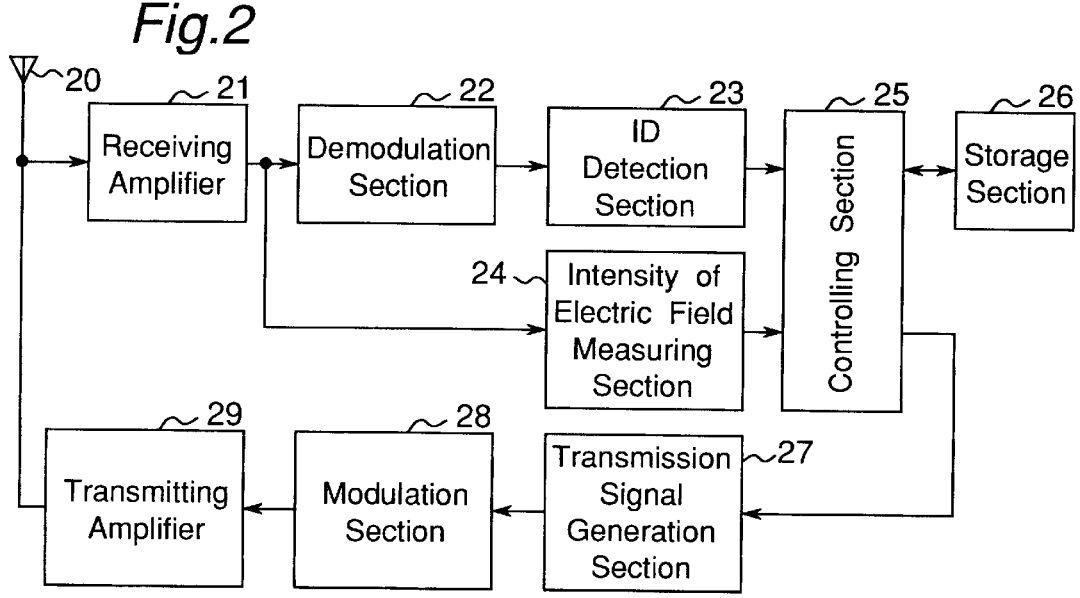
FIG. 2 is a block diagram of the mobile terminal of the above-mentioned preferred embodiment.
Figure 3:
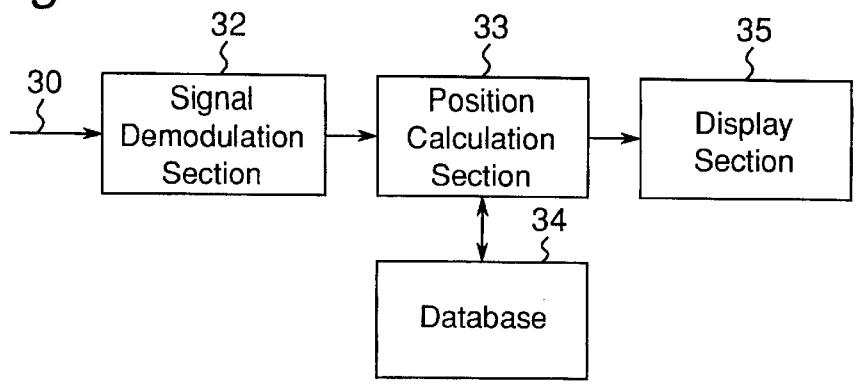
FIG. 3 is a block diagram of a control station of the above-mentioned preferred embodiment.

A first preferred embodiment of the present invention will be, first of all, described. FIG. 1 shows an arrangement of base stations and a mobile terminal of a positional information detecting system according to the first preferred embodiment of the present invention. FIG. 2 shows a construction of the mobile terminal of the preferred embodiment. FIG. 3 shows a construction of the position managing station of the preferred embodiment.

In FIG. 1, 1 denotes a mobile terminal;

2a, 2b, 2c, . . . denote base stations for executing communications and registration of a calling area together with the mobile terminal 1;

3a, 3b, 3c, . . . denote radio zones of the base stations;

4 denotes a general calling area comprised of the plurality of above-mentioned radio zones 3a, 3b, . . . ; and 5 denotes a control station for executing control of line connection to the mobile terminal 1 located inside the general calling area 4.

The base stations 2a, 2b, 2c, . . . are connected to one another by the control station 5 and the telecommunication line equipments 6a, 6b, 6c, . . . The reference numerals 7a, 7b, 7c, . . . denote base station identification information that the base stations 2a, 2b, 2c, . . . periodically transmit.

In FIG. 2, 20 denotes an antenna;

21 denotes a receiving amplifier;

22 denotes a demodulation section;

23 denotes an ID detection section;

24 denotes an intensity of electric field measuring section;

25 denotes a controlling section;

26 denotes a storage section;

27 denotes a transmission signal generation section;

28 denotes a modulation section; and 29 denotes a transmitting amplifier.

In FIG. 3, 30 denotes a communication line;

32 denotes a signal demodulation section;

33 denotes a position calculation section;

34 denotes a database; and 35 denotes a display section.

An operation of the positional information detecting system constructed as discussed above will be described below.

In FIG. 1, the mobile terminal 1 is located inside the general calling area 4 controlled by the control station 5 and executes registration of the calling area into the control station 5 by the operation similar to that of the prior art. The mobile terminal 1 receives the base station identification information 7a, 7b, 7c, . . . that are periodically transmitted from the base stations 2a, 2b, 2c, . . . .

An operation of the mobile terminal 1 will be described with reference to FIG. 2. The radio wave from each base station received by the antenna 20 is amplified in the receiving amplifier 21, is converted into an intermediate frequency, and then, is demodulated into a base band signal by the demodulation section 22. The ID detection section 23 detects the base station identification information 7a, 7b, 7c, . . . of the base stations 2a, 2b, 2c, . . . from the demodulated signal. The intensity of electric field measuring section 24 measures the intensity of received electric field of the base stations 2a, 2b, 2c, . . . from the output of the receiving amplifier 21. The controlling section 25 stores into the storage section 26, the base station identification information outputted from the ID detection section 23 and the information of the intensity of received electric field outputted from the intensity of electric field measuring section 24, as one pair of information (information pair) with regard to each base station. Each information pair is stored into the storage section 26 with regard to the receivable base stations inside the general calling area 4. Next, the mobile terminal 1 originates a call to the position managing station to establish a communication state, and thereafter, the controlling section 25 outputs one or a plurality of information pairs among the plurality of stored information pairs to the transmission signal generation section 27 sequentially from the base station having the information of the greater intensity of received electric field. The transmission signal generation section 27 converts the inputted information into a signal in a prescribed base band signal format, and then, outputs the resulting signal to the modulation section 28. The modulation section 28 modulates the inputted base band signal into a high-frequency signal, and the modulated high-frequency signal is subjected to power amplification in the transmitting amplifier 29, and then, is transmitted from the antenna 20 to the base stations located inside the general calling area 4. The signal from the mobile terminal 1 received by the base stations is transmitted to a position managing station (not shown in FIG. 1) from the control station 5 via the communication line 30.

An operation of the position managing station will be described with reference to FIG. 3. The signal from the mobile terminal 1 received via the communication line 30 is demodulated by the signal demodulation section 32, and then, outputted to the position calculation section 33. The position calculation section 33 determines the position of the mobile terminal 1, with reference to the database 34, based on the inputted one or a plurality of information pairs of the base station identification information and the intensity of received electric field.

Reference will be, first of all, made to the case where single information pair of the base station identification information and the intensity of received electric field is inputted to the position calculation section 33.

It is known that a relation between the intensity of electric field of the base station at the point of reception (the position of the mobile terminal) and the distance from the base station to the point of reception can be approximated to, for example, the following equation:

$$E = A \cdot D^{-\alpha}$$

where E represents an intensity of electric field of the base station at the point of reception (the position of the mobile terminal), D represents a distance from the base station to the point of reception, and A and $\alpha$ are coefficients.

By using the above-mentioned equation, the distance $D_1$ from the mobile terminal 1 located in a position where the intensity of electric field of the base station is $E_1$ to the base station can be obtained by the following equation 1, and it can be determined that the mobile terminal 1 is located at a distance of the radius $D_1$ from the base station.

Equation 1:

$$D_1 = 1/{}^\alpha\sqrt{E_1/A} = K \cdot {}^{-\alpha}\sqrt{E_1}$$

The database 34 stores therein the positional information (geographical information of the place where the base station is located or installed) of each base station and the coefficient K of each base station. The position calculation section 33 obtains the distance $D_1$ from the base station to the mobile terminal, with reference to the coefficient K of the base station from the database 34, and further specifies the point of the mobile terminal 1 to a place in the vicinity of a circumference of the radius $D_1$ on a map, with reference to the positional information of the base station.

Reference will be next made to the case where a plurality of information pairs of the base station identification information and the intensity of received electric field are inputted to the position calculation section 33, based on an example in which three information pairs of base stations 2a, 2b and 2c are inputted.

Figure 4:
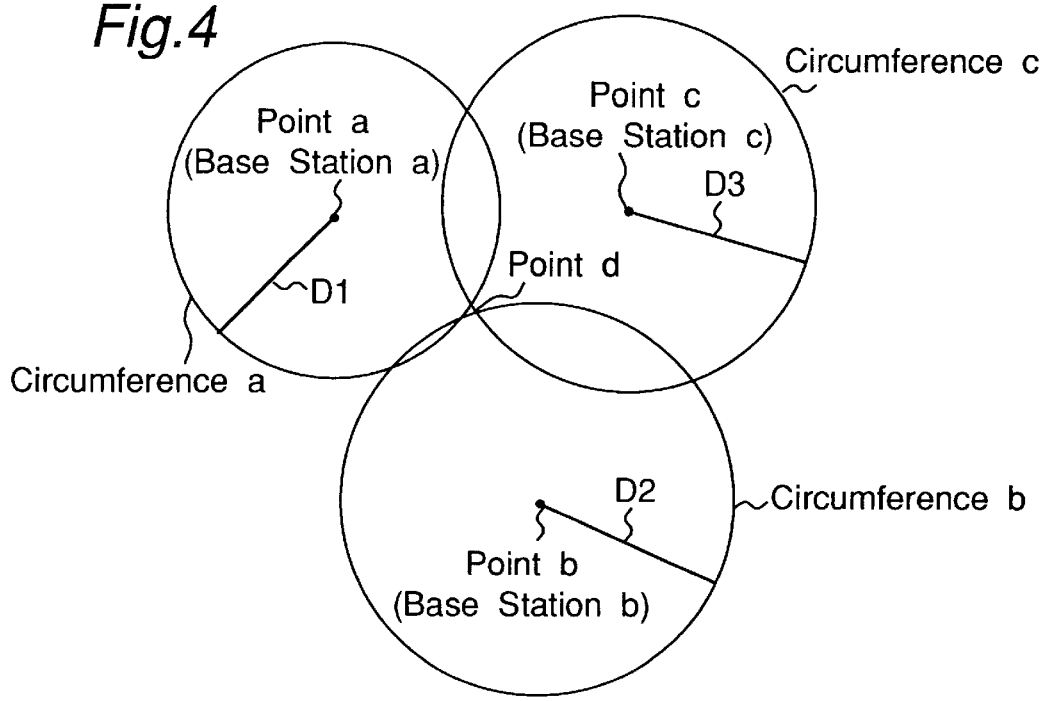
FIG. 4 is a plan view showing a procedure for obtaining the point of the mobile terminal in the above-mentioned preferred embodiment.

FIG. 4 is a plan view showing a procedure for obtaining the point of the mobile terminal 1.

The position calculation section 33 operates in a manner similar to that of the above-mentioned case, based on the information pair of the first base station 2a and determines that the mobile terminal 1 is located in the vicinity of a circumference "a" of the radius $D_1$ from the position (point "a") of a base station "a" in FIG. 4. Likewise, it is determined that the mobile terminal 1 is located in the vicinity of a circumference "b" and a circumference "c" of radii $D_2$ and $D_3$ from the positions (points "b" and "c") of base stations "b" and "c", based on the information pairs of the second and third base stations 2b and 2c. By this operation, the position calculation section 33 specifies that the mobile terminal 1 is located in the vicinity of a point d at which the circumferences "a", "b" and "c" cross one another.

A display section 35 displays the current position of the mobile terminal 1 on the map by means of a display means such as a display.

As described above, according to the present preferred embodiment, the position managing station is able to specify the current position of the mobile terminal 1, with reference to the database 34 of the base stations, and display the point on the map, based on the information pair of the identification information of the base stations 7a, 7b, . . . detected by the mobile terminal 1 and the intensity of received electric field. The current position of the mobile terminal 1 can be specified with higher accuracy by means of the information pairs of the plurality of base stations detected by the mobile terminal 1.

(Second Preferred Embodiment)

Figure 5:
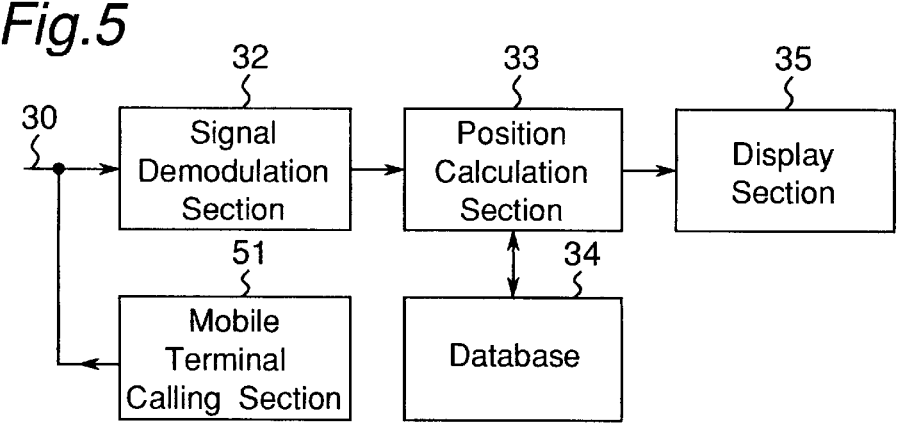
FIG. 5 is a block diagram of a position managing station according to a second preferred embodiment of the present invention.

A second preferred embodiment of the present invention will be described next. FIG. 5 shows a construction of a position managing station of the present preferred embodiment. In the present preferred embodiment, the arrangement of the base stations and the mobile terminal as well as the construction of the mobile terminal are the same as those of the first preferred embodiment shown in FIG. 1 and FIG. 2.

In FIG. 5, the reference numeral 51 denotes a mobile terminal calling section for originating a call to the mobile terminal 1. The other components are the same as those of the components of the first preferred embodiment shown in FIG. 3.

An operation of the positional information detecting system constructed as discussed above will be described below.

In the first preferred embodiment, the mobile terminal operates so as to originate a call to the position managing station and transmit the information pair of the base station. If it is desired to grasp the current position of the mobile terminal only at a timing demanded or requested by the position managing station, then the mobile terminal is not always required to execute the operation of detecting and transmitting the information pair of the base station, so that the unnecessary power consumption can be prevented. An object of the present preferred embodiment is to achieve this.

When the position managing station demands the information pair of the base station from the mobile terminal 1 in order to obtain the current position of the mobile terminal 1, the position managing station originates a call to the mobile terminal 1 by the mobile terminal calling section 51. The mobile terminal 1 receives a calling signal of the position managing station from the base station inside the general calling area 4 via a communication line 30 and the control station 5. The mobile terminal 1 executes the same operation as described in connection with the first preferred embodiment immediately after reception, and transmits one or a plurality of information pairs of the base station identification information and the intensity of received electric field to the position managing station. The operation different from that of the first preferred embodiment resides in such a point that the mobile terminal 1 transmits the information to the position managing station according to the reception from the position managing station and originate no call to the position managing station. The mobile terminal 1 is, of course, allowed to once disconnect the speech communication after the reception from the position managing station, and then execute again completely the same operation as that of the first preferred embodiment. Therefore, when no call is received from the position managing station, the mobile terminal 1 is not required to execute the operation of detecting and transmitting the information pair of the base station, so that the power consumption can be reduced.

The position managing station executes completely the same operation as that of the first preferred embodiment, thereby displaying the current position of the mobile terminal 1 on the map after receiving the information pair of the base station from the mobile terminal 1.

As described above, according to the present preferred embodiment, the mobile terminal 1 detects the information pair of the base station only when the position managing station originates a call to the mobile terminal 1 and transmits the information pair to the position managing station, thereby allowing the power consumption of the mobile terminal 1 to be reduced in addition to the effect described in connection with the first preferred embodiment. The mobile terminal 1 can provide the updated positional information upon request for searching the current position from the position managing station.

(Third Preferred Embodiment)

Figure 6:
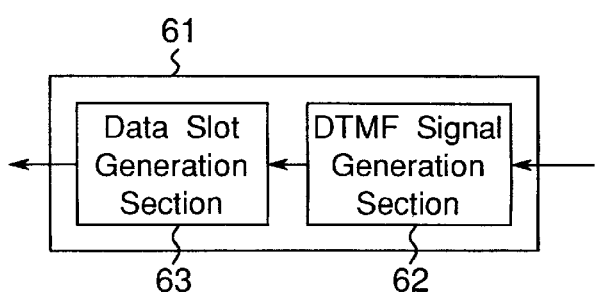
FIG. 6 is a block diagram of a transmission data generating section of the mobile terminal according to a third preferred embodiment of the present invention.

A third preferred embodiment of the present invention will be described next. FIG. 6 shows a construction of a transmission data generating section of a mobile terminal according to the third preferred embodiment. In FIG. 6, 61 denotes a transmission signal generating section;

62 denotes a DTMF signal generation section provided in the front stage inside the transmission signal generating section 61;

63 denotes a data slot generation section provided in the rear stage inside the transmission signal generating section 61.

The other components of the mobile terminal are the same as those of the components of the first preferred embodiment shown in FIG. 2. The arrangement of the base stations and the mobile terminal as well as the construction of the position managing station are the same as those of the first preferred embodiment shown in FIGS. 1 and 3.

An operation of the present preferred embodiment constructed as discussed above will be described below. The audio processing section of the normal mobile terminal for speech communication use is provided with a DTMF signal generation section for generating an audio signal corresponding to each dial key. An object of the present preferred embodiment is to enable completely the same function of specifying the position of the mobile terminal as that of the first preferred embodiment by changing the software of the control section without incorporating any separate voice modem into the normal mobile terminal for speech communication use by converting the one or a plurality of base station identification information and the information of the intensity of received electric field as stated in connection with the first preferred embodiment into a DTMF signal and thereafter converting the resulting signal into a signal having a specified base band signal format.

The operations up to the operation of the controlling section 25 for outputting the one or a plurality of base station identification information and the information of the intensity of received electric field are completely the same as those described in connection with the first preferred embodiment. The DTMF signal generation section 62 converts the inputted information into a DTMF speech signal, and the data slot generation section 63 outputs the inputted DIMF speech signal into a signal having a specified base band digital data slot format, and outputs the resulting signal to the modulation section 28. The subsequent operations are completely the same as the operations described in connection with the first preferred embodiment. The position managing station demodulates the DTMF signal received from the mobile terminal 1 into one or a plurality of base station identification information and the information of the intensity of received electric field by the signal demodulation section 32, and subsequently displays the current position of the mobile terminal 1 on the map through completely the same operation as that of the first preferred embodiment.

As described above, according to the present preferred embodiment, by applying the DTMF speech signal to the generation of the transmission signal of the mobile terminal 1, the DTMF signal generation section provided in the normal mobile terminal for speech communication use can be commonly used, so that a mobile terminal provided with both the speech communication function and completely the same position specifying function as that described in connection with the first preferred embodiment can be implemented on a circuit scale equivalent to that of the normal mobile terminal for speech communication use.

It is, of course, acceptable to apply the construction of the present preferred embodiment to the second preferred embodiment.

Industrial Applicability

As described above, the present invention can produce the effects as follows.

(1) The mobile terminal transmits the base station identification information transmitted from the base station and the information of the intensity of electric field of the radio wave received by the base station to the position managing station, and the position managing station can specify the current position of the mobile terminal with higher accuracy, with reference to the database of the base stations, based on the above-mentioned information. Furthermore, the mobile terminal transmits the base station identification information of a plurality of base stations and the information of the intensity of electric field of the radio wave received by the base stations to the position managing station, thereby allowing the current position of the mobile terminal to be specified with higher accuracy.

(2) The position managing station originates a call to the mobile terminal at a timing when the current position of the mobile terminal is desired to be grasped, and the mobile terminal detects the base station identification information and the information of the intensity of electric field of the radio wave received by the base station only when a call occurs from the position managing station and transmits the information to the position managing station so that the unnecessary power consumption of the mobile terminal is prevented to allow the mobile terminal to have a long battery life and compact size. In addition, the position managing station can grasp the updated current position of the mobile terminal.

(3) By applying the DTMF speech signal to the generation of the transmission signal of the mobile terminal, the DTMF signal generation section provided in the normal mobile terminal for communication use can be commonly used, so that a mobile terminal provided with both the speech communication function and the position specifying function can be implemented on the circuit scale equivalent to that of the normal mobile terminal for speech communication use.

What is claimed is:

1. A positional information detecting system comprising:

a wireless mobile terminal;

a plurality of base stations for executing communications with said wireless mobile terminal; and a position managing station for executing communications with said wireless mobile terminal via said base stations, wherein said wireless mobile terminal comprises:

an ID detection section for detecting base station identification information transmitted from each of said base stations;

an intensity of electric field measuring section for measuring an intensity of electric field of received radio wave from each of said base stations; and a transmission signal generation section for converting one pair or a plurality of pairs of information comprised of the base station identification information of one or a plurality of base stations and the intensity of electric field of received radio wave from said base station, into a transmission signal to said base station, wherein said position managing station comprises:

a signal demodulation section for demodulating a signal received from said wireless mobile terminal via said base station;

a database for storing therein geographical information of a place where each base station of a plurality of base stations is located and a base station coefficient of each base station; and a position calculation section for determining a position of said wireless mobile terminal, with reference to said database, based on one pair or a plurality of pairs of information comprised of the base station identification information of one or a plurality of base stations outputted from said signal demodulation section and the intensity of electric field of received radio wave from said base station, wherein said position calculation section calculates a distance of a radius from said base station to said wireless mobile terminal, based on the intensity of electric field of the received radio wave from said base station and a base station coefficient of said base station stored in said database, by means of an approximate equation for calculating the distance of the radius from said base station to said wireless mobile terminal according to the intensity of electric field of the received radio wave from said base station and the base station coefficient, and then, determines the position of said wireless mobile terminal, based on the calculated distance of the radius and the geographical information of the places of said base stations stored in said database.

2. The positional information detecting system as claimed in claim 1, wherein said position managing station further comprises a mobile terminal calling section for originating a call to said wireless mobile terminal.

3. The positional information detecting system as claimed in claim 2, wherein said transmission signal generation section converts one pair of information into a DTMF signal as said transmission signal, and said signal demodulation section demodulates the received DTMF signal into said one pair of information.

4. The positional information detecting system as claimed in claim 1, wherein said transmission signal generation section converts one pair of information into a DTMF signal as said transmission signal, and said signal demodulation section demodulates the received DTMF signal into said one pair of information.

* * * * *